(12) United States Patent
Issler

(10) Patent No.: US 8,360,026 B2
(45) Date of Patent: Jan. 29, 2013

(54) PIN BOSS AND PISTON PROVIDED WITH IT, FOR AN INTERNAL COMBUSTION ENGINE

(75) Inventor: Wolfgang Issler, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 289 days.

(21) Appl. No.: 12/735,057

(22) PCT Filed: Dec. 10, 2008

(86) PCT No.: PCT/DE2008/002075
§ 371 (c)(1),
(2), (4) Date: Aug. 17, 2010

(87) PCT Pub. No.: WO2009/076938
PCT Pub. Date: Jun. 25, 2009

(65) Prior Publication Data
US 2010/0300396 A1    Dec. 2, 2010

(30) Foreign Application Priority Data
Dec. 14, 2007  (DE) .......................... 10 2007 060 473

(51) Int. Cl.
*F02F 3/00* (2006.01)
*F16J 1/16* (2006.01)
(52) U.S. Cl. .................................................. 123/193.6
(58) Field of Classification Search ............... 123/193.6; 82/187; 92/187
See application file for complete search history.

(56) References Cited

U.S. PATENT DOCUMENTS

| | | | |
|---|---|---|---|
| 2,387,634 A | 10/1945 | Anderson | |
| 3,357,318 A | 12/1967 | Packard et al. | |
| 5,746,169 A | 5/1998 | Issler et al. | |
| 6,513,477 B1* | 2/2003 | Gaiser et al. | 123/193.6 |
| 7,647,863 B2* | 1/2010 | Issler et al. | 92/187 |
| 8,205,591 B2* | 6/2012 | Kemnitz | 123/193.6 |
| 2005/0150374 A1 | 7/2005 | Weinkauf et al. | |
| 2009/0114087 A1 | 5/2009 | Fezer | |

FOREIGN PATENT DOCUMENTS

| | | |
|---|---|---|
| DE | 30 36 062 | 4/1982 |
| DE | 44 41 452 | 5/1996 |
| DE | 102 22 463 | 12/2003 |
| DE | 10 2004 008 097 | 9/2005 |
| DE | 10 2006 015 586 | 10/2007 |
| EP | 0 065 642 | 12/1982 |
| JP | 62-184274 | 8/1987 |
| JP | 2001-295697 | 10/2001 |
| JP | 2004-028025 | 1/2004 |
| WO | WO 96/07841 | 3/1996 |

OTHER PUBLICATIONS

International Search Report.
German Search Report May 7, 2008 with English translation of the relevant parts.

* cited by examiner

*Primary Examiner* — M. McMahon
(74) *Attorney, Agent, or Firm* — Collard & Roe, P.C.

(57) ABSTRACT

The invention relates to a pin boss (17) for a piston (10) for an internal combustion engine, the pin boss (17) having an inner boss surface (17a) and an outer boss surface (17b) and a boss bore (18) for accommodating a piston pin. The boss bore (18), in the vertex of the boss, has a pocket (20) the depth of which gradually decreases along the boss contour towards the outer boss surface (17b).

14 Claims, 2 Drawing Sheets

PIN BOSS AND PISTON PROVIDED WITH IT, FOR AN INTERNAL COMBUSTION ENGINE

CROSS REFERENCE TO RELATED APPLICATIONS

Figure 1:
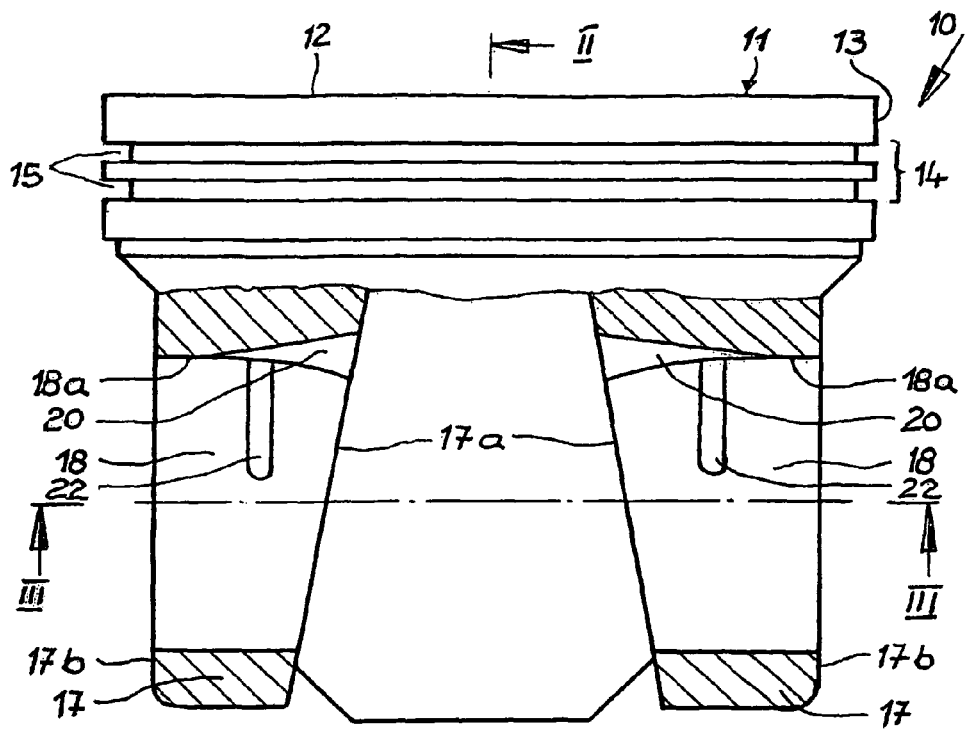

This application is the National Stage of PCT/DE2008/002075 filed on Dec. 10, 2008, which claims priority under 35 U.S.C. §119 of German Application No. 10 2007 060 473.6 filed on Dec. 14, 2007. The international application under PCT article 21(2) was not published in English.

The invention relates to a pin boss for a piston for an internal combustion engine, whereby the pin boss is provided with an inner boss surface and an outer boss surface as well as with a pin bore for accommodating a piston pin. The present invention furthermore relates to an internal combustion engine that is provided with such pin bosses.

In the configuration of pin bosses, it must be noted that the gas forces that act on the piston crown during operation are transferred to the piston pin by way of the pin bosses. In this connection, significant stresses occur, in part, which can contribute to crack formation in the pin boss, for example. In particular, stresses on the piston crown generated by the gas forces can exceed the tolerated degree, particularly in the case of pistons having a low compression height, which are used in gasoline engines. In order to reduce these stresses, it has been proposed to introduce a vertical ovality into the pin bore, in the direction of the piston crown, as disclosed, for example, in DE 10 2004 008 097 A1. However, this is accompanied by a reduction in boss strength, particularly as compared with pin bosses provided with a transverse ovality. Furthermore, it has been shown that pin bosses provided with a vertical ovality on one side can cause undesirable noises, which arise out of the movement of the piston pin.

The present invention is therefore based on the task of further developing a pin boss of the type indicated, in such a manner that while the boss strength is improved, not only are the stresses in the region of the piston crown reduced, but also undesirable noises are avoided, and the strength of the pin boss is not significantly worsened.

To accomplish this task, a pin boss having the characteristics of claim 1 and a piston provided with such pin bosses are proposed. According to the invention, it is provided that the pin bore has a pocket in the boss zenith, the depth of which, along the boss contour, constantly decreases in the direction of the outer boss surface.

It is surprising to a person skilled in the art that it turned out that the strength of the pin boss according to the invention is clearly increased with the configuration of the pin bore according to the invention, and, at the same time, the crown stresses are significantly reduced. The increase in strength of the pin boss according to the invention is based on the fact that the radial hydrodynamic displacement pressure is eliminated as a stress component in the boss zenith, and thus the ability of the pin boss according to the invention to withstand stress is significantly increased. The reduction in the crown stresses is attributable to the fact that a load redistribution in the circumference direction of the piston pin takes place, which has a positive influence on the deformation behavior of the piston pin and thus on the local strains and stresses. At the same time, reduced noise development during operation is achieved, as compared with the pin bore described in the prior art and provided with a vertical ovality, since the basic boss contour (i.e. the cross-sectional contour of the pin bore) can be selected in any desired manner, independent of the shape and configuration of the pocket provided according to the invention. As a result, adaptation of the boss contour to the requirements of an individual case is improved. In addition, the pocket provided according to the invention acts as an oil reservoir for improved lubrication of the pin bore. Thus, the goals aimed at according to the invention can be achieved with little effort.

Advantageous further developments are evident from the dependent claims.

The pocket provided according to the invention preferably extends over 50% to 90%, particularly over 60% to 80% of the length of the pin boss. As a result, additional freedom of movement for individual configuration of the pin boss according to the invention exists; for example, the pin boss can have a profiled pin bore in the region of the outer boss surface and/or the inner boss surface.

The width of the pocket provided according to the invention amounts to at least 20%, for example, particularly 25% to 40% of the diameter of the piston pin, on the inner boss surface. As a result, the strength of the pin boss according to the invention can be further optimized, for example to more than 120% of the strength of conventional pin bosses.

The pocket provided according to the invention can be dimensioned, in a variant, for optimization of the strength of the pin boss according to the invention, in such a manner that the end points of the edge of the pocket provided according to the invention enclose an angle of 30° to 50°, with reference to the center axis of the piston pin, on the inner boss surface.

A preferred embodiment of the present invention provides that the cross-sectional contour of the edge of the pocket provided according to the invention has the shape of an ovality superimposed on the pin bore. This brings about the result that the pocket provided according to the invention, i.e. its edge, makes a transition into the pin bore with a soft, continuous transition. As a result, the mechanical stress on the edge of the pocket during operation is reduced, and the risk of pin friction or boss friction, or of pin seizing or boss seizing, is avoided.

Depending on the requirements of the individual case, the ovality can be configured as a positive or negative dual ovality, as an ovality of a higher order, or as a local sine-shaped deviation in shape. In a preferred further development, the oval diameter of the superimposed ovality constantly decreases in the direction of the outer boss surface, or runs in a constantly reduced circumference region of the pin bore, respectively, so that in this embodiment, as well, an additional freedom of movement for individual configuration of the pin boss according to the invention exists.

The pocket provided according to the invention can be introduced into a cylindrical pin boss or one having a transverse ovality. Particularly in the case of a pin boss having a transverse ovality, particularly great boss strength is observed.

Finally, it can be advantageous if a lubrication groove that runs over at least a part of the circumference is provided in the pin bore, which groove opens into the pocket provided according to the invention, in order to further improve its lubrication effect.

Figure 2:
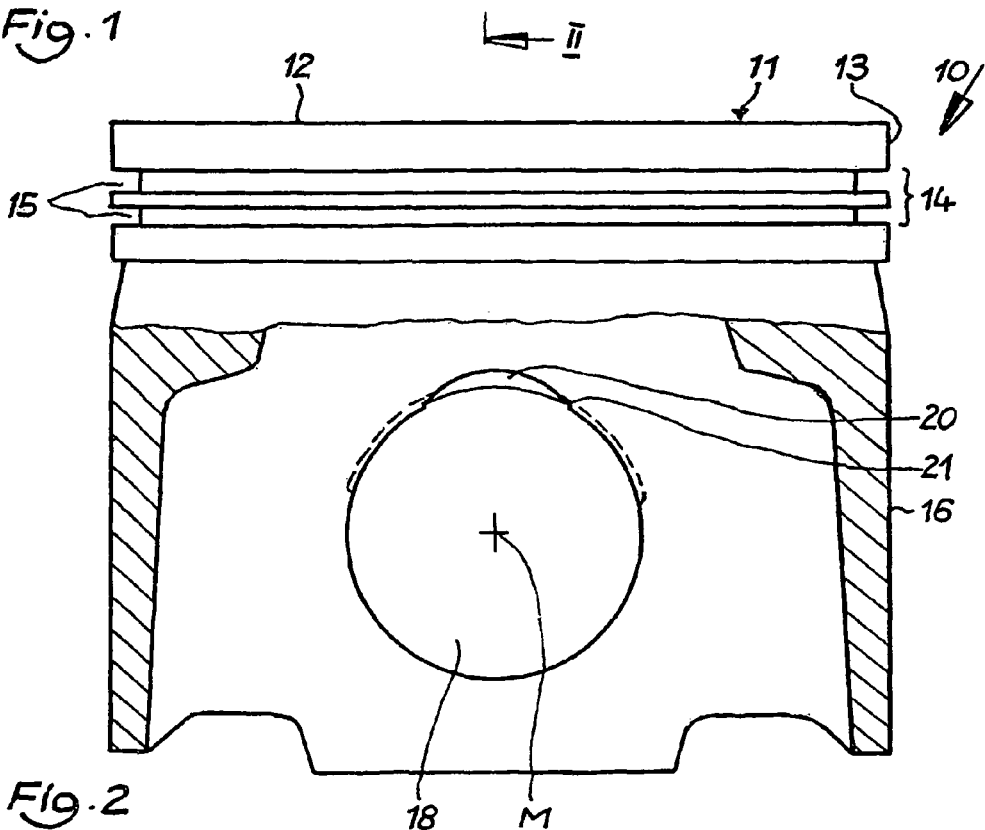
Figure 3:
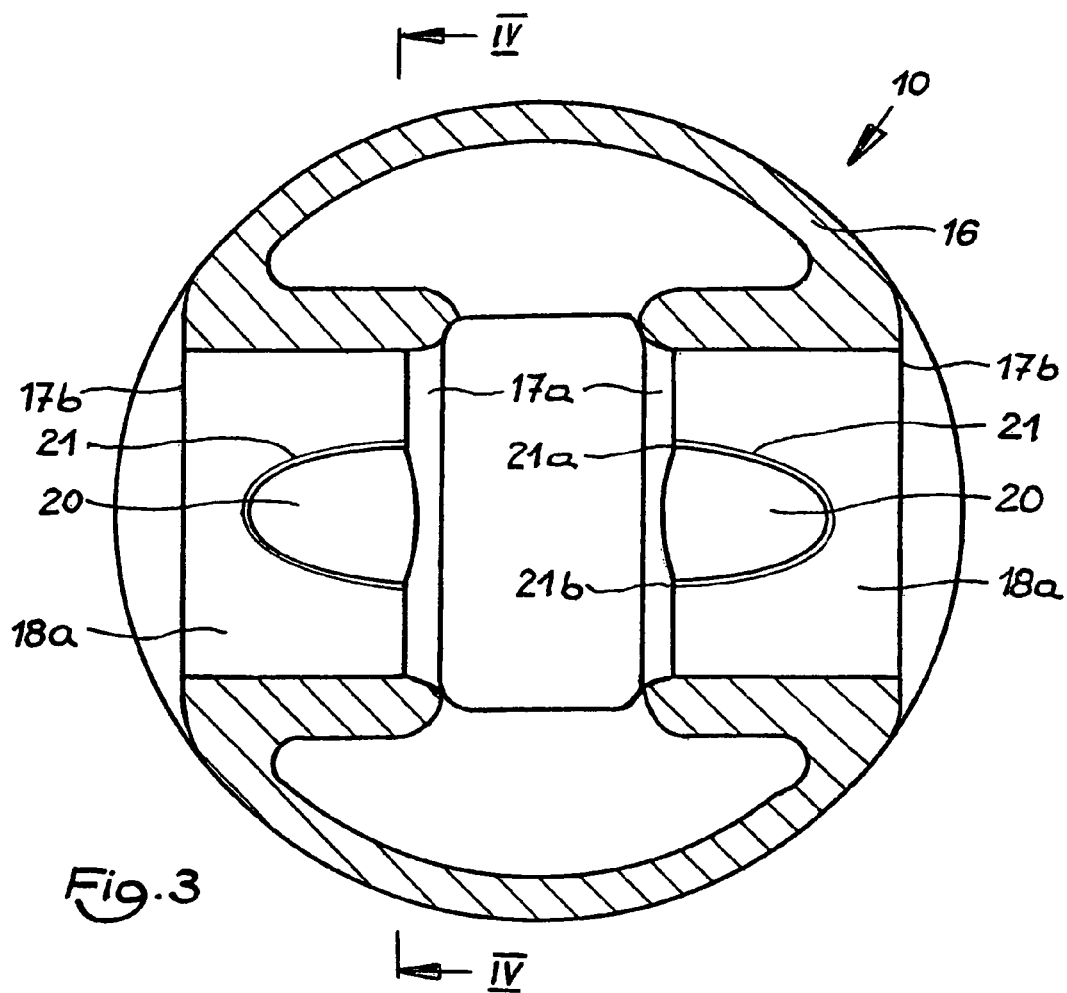
Figure 4:
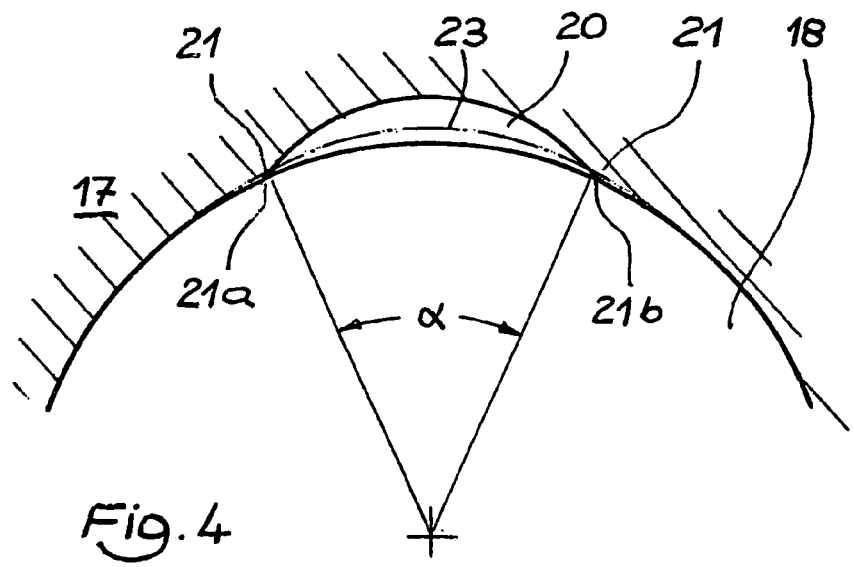

An exemplary embodiment of the present invention will be described in the following, using the attached drawings. These show, in a schematic representation, not true to scale:

FIG. 1 an exemplary embodiment of a piston provided with pin bosses according to the invention, partly in section;

FIG. 2 a section along the line II-II in FIG. 1;

FIG. 3 a section along the line in FIG. 1;

FIG. 4 a section along the line IV-IV in FIG. 3, shown enlarged in a detail.

FIGS. 1 and 2 show a piston 10 that is in one piece in the exemplary embodiment. The piston 10 has a piston head 11 having a piston crown 12, a circumferential top land 13, and a circumferential ring belt 14 with ring grooves 15 for piston rings, not shown. Below the piston head 11, a piston skirt 16 and pin bosses 17, each having pin bores 18 having a mantle surface 18a, for accommodating a piston pin (not shown), are provided. The pin bosses 17 have an inner boss surface 17a and an outer boss surface 17b, in each instance.

According to the invention, the pin bosses 17 are configured in such a manner that the pin bores 18 have a pocket 20 in the boss zenith, in each instance. The pockets 20 can be introduced into the pin bores 18 using a milling tool, for example. In the exemplary embodiment, each pocket 20 has a cross-sectional contour in the shape of an arc (see FIG. 4), the depth of which, into the crown-side boss surface, constantly decreases along the boss contour, in the direction of the outer boss surface 17b. In other words: The pocket 20 becomes flatter and flatter in the direction of the outer boss surface 17b, and finally runs out into the mantle surface 18a of the pin bore 18. As shown in FIG. 1, lubrication grooves 22 are furthermore introduced into the surface of the pin bores 18 in the exemplary embodiment, which grooves run over at least a part of the circumference of the pin bore 18. The lubrication grooves 22 are disposed approximately at the boss vertex in the exemplary embodiment, and preferably have a depth of 0.01 to 1 mm. The lubrication grooves 22 serve to further improve the oil distribution as well as the boss lubrication.

As is particularly evident from FIG. 3, in the exemplary embodiment the total length of the pocket 20 amounts to about 80% of the length of the pin bore that carries it, so that the possibility of providing a profiled pin bore having any desired configuration (not shown) exists in the region of the outer boss surface 17b. Depending on the requirements of an individual case, a profiled pin bore can also be provided in the region of the boss inside 17a. Profiled pin bores as such are known to a person skilled in the art.

It is particularly evident from FIG. 4 that the end points 21a, 21b of the edge 21 of the pocket 20 enclose an angle α of about 45° in the exemplary embodiment, with reference to the center axis M of the piston pin. The preferred opening angle α amounts to about 30° to 50°.

In the exemplary embodiment shown, as is particularly evident from FIGS. 3 and 4, the circumferential edge 21 of the pocket 20 is provided with a superimposed ovality 23. This ovality 23 superimposed on the pin bore 18 serves to reduce the stresses that proceed from the piston pin in the region of the pocket 20.

This superimposed ovality 23 can particularly be superimposed on the cross-sectional contour of the edge 21 of the pocket 20, in known manner, in the sense of a positive or negative dual ovality, an ovality of a higher order, or a local sine-shaped deviation in shape. The calculation of such ovalities is known to a person skilled in the art. The superimposed ovality described can be introduced within the scope of the roundness machining of the pin bore 18, for example, particularly by means of a 3D-controlled machine.

In the exemplary embodiment, the pin bore 18 is shown as a purely cylindrical pin bore (see FIG. 2). The pin bore 18 can, however, have a known transverse ovality, in particularly advantageous manner, to improve the boss strength. Alternatively or in addition to this, the pin bore 18 can have a profiled pin bore of any desired type, not shown here, outside the pocket 20, in the region of the outer boss surface 17b and/or in the region of the inner boss surface 17a.

The invention claimed is:

1. Pin boss (17) for a piston (10) for an internal combustion engine, whereby the pin boss (17) is provided with an inner boss surface (17a) and an outer boss surface (17b) as well as with a pin bore (18) for accommodating a piston pin, wherein the pin bore (18) has a pocket (20) in the bore zenith, the depth of which, along the bore contour, constantly decreases in the direction of the outer boss surface (17b), and wherein the cross-sectional contour of the edge (21) of the pocket (20) has the shape of a zenith-sided ovality (23) superimposed on the pin bore (18).

2. Pin boss according to claim 1, wherein the pocket extends over 50% to 90% of the length of the pin bore.

3. Pin boss according to claim 2, wherein the pocket (20) extends over 60% to 80% of the length of the pin bore.

4. Pin boss according to claim 2, wherein the pin boss (17) has a profiled pin bore in the region of the outer boss surface (17b) and/or in the region of the inner boss surface (17a).

5. Pin boss according to claim 1, wherein the width of the pocket (20) on the inner boss surface (17a) amounts to at least 20% of the diameter of the piston pin.

6. Pin boss according to claim 5, wherein the width of the pocket (20) on the inner boss surface (17a) amounts to 25% to 40% of the diameter of the piston pin.

7. Pin boss according to claim 1, wherein the ovality (23) is configured as a positive or negative dual ovality, as an ovality of a higher order, or as a local sine-shaped deviation in shape.

8. Pin boss according to claim 1, wherein the height of the superimposed ovality (23) constantly decreases in the direction of the outer boss surface (17b).

9. Pin boss according to claim 1, wherein the width of the superimposed ovality (23) continuously decreases in the direction of the outer boss surface (17b).

10. Pin boss according to claim 1, wherein the pocket (20) is introduced into a cylindrical pin bore.

11. Pin boss according to claim 1, wherein the pocket (20) is introduced into a pin bore having a transverse ovality.

12. Pin boss according to claim 1, wherein a lubrication groove (22) that runs over at least a part of the circumference is provided in the pin bore (18), which groove opens into the pocket (20).

13. Pin boss for a piston for an internal combustion engine, wherein the pin boss is provided with an inner boss surface and an outer boss surface as well as with a pin bore for accommodating a piston pin, wherein the pin bore has a pocket in the bore zenith, the depth of which, along the boss contour, constantly decreases in the direction of the outer boss surface, wherein the end points (21a, 21b) of the edge (21) of the pocket (20) enclose an angle (α) of 30° to 50°, with reference to the center axis (M) of the piston pin.

14. Piston (10) for an internal combustion engine, comprising:
   a piston head;
   a piston skirt; and
   a pin boss connected to the piston head, wherein the pin boss is provided with an inner boss surface and an outer boss surface as well as with a pin bore for accommodating a piston pin, wherein the pin bore has a pocket in the boss zenith, the depth of which, along the boss contour, constantly decreases in the direction of the outer boss surface, and wherein the cross-sectional contour of the edge of the pocket has the shape of a zenith-sided ovality superimposed on the pin bore.

* * * * *

UNITED STATES PATENT AND TRADEMARK OFFICE
CERTIFICATE OF CORRECTION

PATENT NO. : 8,360,026 B2  Page 1 of 1
APPLICATION NO. : 12/735057
DATED : January 29, 2013
INVENTOR(S) : Wolfgang Issler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this
First Day of September, 2015

Michelle K. Lee
*Director of the United States Patent and Trademark Office*